Patented Mar. 8, 1938

2,110,363

UNITED STATES PATENT OFFICE 2,110,363

ANHYDROUS WATER SOLUBLE SILICATES AND METHOD OF PREPARING SAME

Lloyd T. Howells, Cleveland Heights, Ohio, Alfred W. Scheidt, Sewaren, N. J., and Herbert B. Williams, Lockport, N. Y., assignors to The Electric Smelting and Aluminum Company, Cleveland, Ohio, a corporation of Ohio No Drawing. Application December 22, 1933, Serial No. 703,550

8 Claims. (Cl. 87—5)

Our invention relates to anhydrous detergents and the method of preparing the same.

In the Cowles Patent No. 1,774,872, patented September 2, 1930, is disclosed a detergent of the anhydrous alkali metal silicate type. In the Cowles Patent No. 1,745,844, patented February 4, 1930, is disclosed a general formula for detergents of the anhydrous alkali metal aluminum silicate type, which formula is as follows:

in which R represents an alkali metal, such as sodium or potassium, and $x$ may have any value greater than 7.

Our invention relates more particularly to improvements in the detergents of the anhydrous alkali metal silicate type and anhydrous alkali metal aluminum silicate type disclosed in the said Cowles patents, and to the method of preparing such detergents.

In the production of such anhydrous silicates, it has heretofore been the practice to form a charge comprising an alkali metal carbonate and silica, or an alkali metal carbonate, silica and an aluminum silicate, in the desired proportions and fuse the mixture in a suitable furnace. The fused mass was then discharged from the furnace into brick lined molds or in molds formed of iron or ferrous material, or formed into sheets as disclosed in the patent of A. W. Scheidt, No. 1,944,848, granted January 23, 1934.

When the fused material is not properly cooled, the product has not been entirely satisfactory because in the slow cooling or solidification of the fused material a considerable portion may crystallize into an opaque material which is not readily soluble in an aqueous solution of the remainder of the material.

It is, therefore, an object of our invention to provide an improved anhydrous material, and the method of producing same, that is highly soluble in water and is substantially free from crystalline material that is insoluble in an aqueous solution of the remainder of the material.

Another object of our invention is to provide a process of producing a detergent material, by means of which a material may be formed that is substantially free from crystalline, opaque material which is insoluble in an aqueous solution of the remainder of the material.

A further object of our invention is to provide an improved anhydrous detergent containing an alkali metal silicate or an alkali metal aluminum silicate which is highly soluble in water.

A still further object of our invention is to provide an anhydrous detergent in the form of a transparent, or substantially transparent, sheet that has a comparatively high degree of causticity and which is comparatively free from foreign inclusions or other impurities.

Another object of our invention is to provide an anhydrous detergent formed of an alkali metal, silicon and oxygen or an alkali metal, silicon, aluminum and oxygen that has a high degree of causticity, is transparent, or substantially transparent, and which is substantially free from crystalline material which decreases its solubility in water.

In preparing a charge for producing our improved detergent, an alkali metal carbonate is mixed with silica in suitable proportions to form an alkali metal silicate or a mixture of alkali metal silicates, or with aluminum silicate and silica or alumina and silica, to form an alkali metal aluminum silicate, a mixture of alkali metal aluminum silicates, or a mixture of an alkali metal silicate and an alkali metal aluminate.

For producing an alkali metal silicate detergent, an alkali metal carbonate is preferably mixed with silica in proportions of approximately ½ to 2 molecular parts of alkali carbonate to one molecular part of silica, and in preparing the alkali metal aluminum silicate a portion of the alkali metal carbonate is replaced by alumina which is introduced in the form of alumina or an aluminum silicate so that the alkali metal oxide, together with the alumina, will be present in approximately equi-molecular proportions with the silica content, as indicated in the Scheidt patent and Cowles Patent No. 1,745,844, referred to above, and the alkali metal oxide will be present in the detergent in a molecular proportion many times the molecular weight of the aluminum oxide, dependent upon the value of the letter $x$ in the general formula given above.

After the charge is prepared, it is fused in a suitable furnace into the form of a thin liquid. During the fusion operation, the alkali metal carbonate is decomposed, and the alkali metal oxide combines with the silica to form an alkali metal silicate or a mixture of alkali metal silicates, or with the silica and alumina to form an alkali metal aluminum silicate, a mixture of alkali metal aluminum silicates, or a mixture of an alkali metal silicate and an alkali metal aluminate. When the proportions of alkali metal carbonate and silica are within the range specified, an alkali metal silicate, or a mixture of alkali metal silicates, will be produced in which approximately ½ to 2 molecules of alkali metal oxide are present for each molecule of silica. It will be understood, however, that we do not desire to limit our invention to a detergent containing a silicate having a specified formula, as the detergent may be either an alkali metal silicate, a mixture of alkali metal silicates, an alkali metal aluminum silicate, a mixture of alkali metal aluminum silicates, or a mixture of an alkali metal silicate and an alkali metal aluminate.

The particular rate of cooling is dependent upon the composition of the material. For example, in the range of ¾ to 1½ molecules of alkali metal oxide to each molecule of silica, it is important to have rapid cooling to obtain a product that is highly soluble in water. This is particularly true when the ratio is approximately 1 to 1. If a fused product of such a composition is not properly cooled, a portion of the material crystallizes, forming an opaque material, a part of which at least is not soluble in an aqueous solution of the remaining material. As the amount of silica is increased, however, the cooling need not be so rapid and a substantially transparent product can still be obtained which is highly soluble in water. On the other hand, as the amount of sodium oxide is increased a product may be obtained which is highly soluble in water even when the cooling rate is not so rapid.

If the fused product is not properly cooled, however, a portion of the material may crystallize into an opaque material, which is not soluble in an aqueous solution of the remaining material. Such insoluble portion is objectionable in many of the applications for which the material is used and detracts considerably from its commercial value.

It has been discovered, however, that if the fused mass is cooled sufficiently rapidly below what may be termed a critical temperature, the opaque, crystalline material that is insoluble in a solution of the remainder of the material is not formed, and a material is produced that is highly soluble in water and free from such opaque, crystalline material.

The particular rate of cooling which is necessary to obtain a transparent or substantially transparent product is somewhat dependent upon the ratio of sodium oxide, or sodium oxide and alumina, to silica. For example, if the molecular proportion of alkali metal oxide to silica in the alkali metal silicate is comparatively low, the cooling rate need not be so rapid, but if the molecular proportion of alkali metal oxide is above that of the silica, the cooling must be conducted at a somewhat faster rate.

The following specific example will serve to illustrate and explain our invention, although it will be understood that we do not desire to limit ourselves to the particular proportions or the temperatures specified.

Sodium carbonate and silica were fused in such proportions that the ratio of sodium oxide to silica in the fused mass was in the proportion of approximately 1 molecular part sodium oxide to 1.2 molecular parts of silica. The fused product was cooled to below 1000° F. within a period of five seconds and a clear transparent product was obtained. For such a composition, the critical temperature probably occurs between 1000° and 1100° F. but cooling quickly from the fusion point to below 1000° F. assures good results.

The cooling may be performed in any desirable manner, such as by passing the fused material into shallow metal containers which are cooled by water. In this manner, thin transparent sheets of the desired thickness may be obtained. If such a method is utilized, the cooling may be further expedited by means of a blast of air. The cooling, however, must be sufficiently rapid so that opaque, crystalline material which is insoluble in an aqueous solution of the remainder of the material will not be formed.

Another method of cooling the material is to spray it into chilled air or the material may be cooled by artificial refrigeration.

A very desirable method of forming the transparent or substantially transparent material in commercial quantities is to pass the fused product directly from the furnace between hollow rolls which may be operated by any desired mechanism. The interior of the rolls may be cooled by any suitable means, such as water, and are spaced to form thin sheets of the desired thickness. The cooling rate may be regulated by the speed of the rolls and the quantity of water used in cooling them, or if desired, a suitable refrigerant may be used.

Our improved detergent yields a higher pH in aqueous solution than any other alkaline compound with the exception of the alkali metal hydroxides. Alkali hydroxides, however, are not suitable for use as detergents because of their known corrosive action on organic fibres and metals.

Our improved detergent, because of its inherent chemical composition, exhibits a protective action which enables it to be used in detergent processes without deleterious effect. If may be used alone or as an aid to soap, or other emulsifying agents.

To aid soap, a detergent must have a pH appreciably above soap, and the higher its causticity the more suitable it is for this purpose. However, causticity is limited by its effect on the articles being cleaned, and in this respect our improved detergent makes possible the use of higher, more efficient alkalinity in cleaning processes because of its natural high alkalinity and protective properties.

In addition to its outstanding qualities in building soap, our improved detergent has high neutralizing power in respect to both organic and inorganic acids encountered in the form of dirt.

Instead of utilizing an alkali metal carbonate in preparing our improved detergent, it will, of course, be understood that other alkali metal compounds or a mixture of alkali metal compounds containing alkali metal oxide may be employed. It will also be apparent that, instead of utilizing sodium carbonate as specified in the specific examples, potassium carbonate or a mixture of potassium carbonate and sodium carbonate may be employed. For economical reasons, however, we prefer to utilize sodium carbonate.

From the foregoing specification it will be apparent that we have provided an improved detergent in a transparent, or substantially transparent form which is highly soluble in water and which is substantially free from crystalline compounds which are not freely soluble in an aqueous solution of the transparent material.

It will also be seen that since our improved detergent in its preferred form is transparent, or substantially transparent, inclusions, such as scale, may be readily observed and easily removed. A detergent is thus produced which is not only completely soluble in water but which is substantially free from impurities which detract from its commercial value. It will also be seen that our improved detergent may be economically prepared from cheap and readily obtainable material, and since it is anhydrous a much smaller amount need be employed and it may be shipped in smaller containers and at a lower cost.

While the product referred to in this application has been termed a "detergent" in a great many places, it is to be understood that the process and product disclosed herein relate to the anhydrous alkali metal silicates or alkali metal aluminum silicates of the composition set forth in this application, and that such silicates or mixtures of them may be used for other purposes than detergents, such as in sizing operations, partially neutralizing rosin, de-inking paper, dyeing operations, and for many other purposes.

It will, therefore, be seen that while the product has frequently been termed a "detergent" in this application, the product is capable of uses other than as a detergent.

To those skilled in the art many modifications and widely differing embodiments and applications of our invention will suggest themselves without departing from the spirit and scope thereof. Our disclosure and the description herein are purely illustrative and are not intended to be in any sense limiting.

What we claim is:

1. The method of preparing material suitable for detergent purposes, which comprises preparing a fused anhydrous alkali metal silicate containing from ¾ to 1½ molecules of alkali metal oxide to 1 molecule of silica and cooling the fused material with sufficient rapidity to a temperature below approximately 1000° F. to prevent the formation of opaque, crystalline material in the solid product and to obtain a substantially transparent solid product which is highly soluble in water and is substantially free from opaque crystalline material that is relatively insoluble in an aqueous solution of the transparent product.

2. The method of preparing a soluble anhydrous material suitable for detergent purposes, which comprises preparing a fused mass containing an alkali metal oxide, alumina and silica in chemical combination in such proportions that the alkali metal oxide and alumina taken together are present in approximately equi-molecular proportions with the silica, and in which the molecular proportion of the alkali metal oxide is at least 7 times greater than the molecular proportion of the alumina, and immediately chilling the fused material by artificial means with sufficient rapidity to a temperature below approximately 1000° F. to obtain a substantially transparent solid product which is substantially free from opaque crystalline compounds that are relatively insoluble in an aqueous solution of the substantially transparent product.

3. A detergent comprising an anhydrous, substantially transparent alkali metal silicate in which alkali metal oxide and silica are present in molecular proportions of approximately ¾ to 1½ of alkali metal oxide to 1 of silica, and which is highly soluble in water and substantially free from opaque, crystalline material relatively insoluble in an aqueous solution of the transparent material.

4. A detergent comprising an anhydrous alkali metal alumina silicate in which the alkali metal oxide and the alumina, together, are present in approximately equi-molecular proportions with the silica, said compound being substantially transparent and highly soluble in water and being substantially free from opaque, crystalline material relatively insoluble in an aqueous solution of the transparent material.

5. The method of preparing basic silicates of the anhydrous alkali metal silicate type, which comprises preparing a fused mass of such material containing from ¾ to 1½ molecules of alkali metal oxide to 1 molecule of silica and chilling the material by artificial means through its critical temperature range to a temperature below approximately 1000° F. within a period of about five seconds, thereby forming a substantially transparent solid product which is substantially free from opaque, crystalline material relatively insoluble in an aqueous solution of the transparent product.

6. The method of preparing basic silicate detergents of the anhydrous alkali metal silicate type and of the anhydrous alkali metal aluminum silicate type having molecular proportions in which the metal radicals are present in the ratio of not less than ¾ or more than 1½ molecules to 1 of silica, which comprises preparing a fused mass of such basic anhydrous silicates and cooling the fused material with sufficient rapidity to a temperature below approximately 1000° F. to prevent the formation of opaque, crystalline material in the solid product and to obtain a substantially transparent solid product which is highly soluble in water and is substantially free from opaque, crystalline material that is relatively insoluble in an aqueous solution of the transparent product.

7. The method of preparing basic silicate detergents of the anhydrous alkali metal silicate type and of the anhydrous alkali metal aluminum silicate type having molecular proportions in which the metal radicals are present in approximately equi-molecular proportions with the silica, which comprises preparing a fused mass of such anhydrous metal silicates in such molecular proportions and cooling the fused material sufficiently rapidly to a temperature below approximately 1000° F. to form a substantially transparent solid product which is substantially free from opaque, crystalline material that is relatively insoluble in an aqueous solution of the transparent product.

8. The method of preparing detergents of the anhydrous alkali metal silicate type, which comprises preparing a fused anhydrous alkali metal silicate containing the alkali metal oxide and silica in approximately equi-molecular proportions and cooling the fused material sufficiently rapidly to a temperature below approximately 1000° F. to form a substantially transparent solid product which is substantially free from opaque, crystalline material that is relatively insoluble in an aqueous solution of the transparent product.

LLOYD T. HOWELLS.
ALFRED W. SCHEIDT.
HERBERT B. WILLIAMS.